(12) United States Patent
Gorny et al.

(10) Patent No.: US 10,992,904 B2
(45) Date of Patent: Apr. 27, 2021

(54) ALWAYS-ON TELECONFERENCE COMMUNICATION HUB

(71) Applicant: Nextiva, Inc., Scottsdale, AZ (US)

(72) Inventors: Tomas Gorny, Scottsdale, AZ (US); Jean-Baptiste Martinoli, St Anaclet de Lesard (CA); Tracy Conrad, Scottsdale, AZ (US); Lukas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

(21) Appl. No.: 16/867,875

(22) Filed: May 6, 2020

(65) Prior Publication Data

US 2021/0021786 A1 Jan. 21, 2021

Related U.S. Application Data

(60) Provisional application No. 62/876,406, filed on Jul. 19, 2019.

(51) Int. Cl.
*H04N 7/15* (2006.01)

(52) U.S. Cl.
CPC .................................... *H04N 7/15* (2013.01)

(58) Field of Classification Search
CPC ............. H04N 7/15; H04N 7/152; H04N 7/14
USPC ............................................ 348/14.01–14.16
See application file for complete search history.

(56) References Cited

U.S. PATENT DOCUMENTS 7,733,366 B2   6/2010   Beavers et al.
8,072,479 B2   12/2011  Valliath et al.
8,204,195 B2   6/2012   Geppert et al.
9,426,422 B2   8/2016   Gandhi
9,621,603 B2   4/2017   Vadla Ravnas
2003/0234859 A1*  12/2003  Malzbender ..... H04N 21/44012
                                                  348/14.05
2005/0237376 A1*  10/2005  Roessler .......... H04N 21/21805
                                                  348/14.04

(Continued)

OTHER PUBLICATIONS

International Search Report for Application No. PCT/US2020/041192 dated Oct. 13, 2020. 2 Pages.

*Primary Examiner* — Melur Ramakrishnaiah
(74) *Attorney, Agent, or Firm* — Spencer Fane LLP; Steven J. Laureanti

(57) ABSTRACT

A system and method are disclosed for generating a teleconference space for two or more teleconference devices, each teleconference device operatively associated with at least one user and comprising an audiovisual recording device and an audiovisual display device, using a computer coupled with a database and comprising a processor and memory. The computer generates a teleconference space and transmits requests to join the teleconference space to the two or more teleconference devices. The computer stores in memory identification data for each of the two or more teleconference devices. The computer receives inbound audiovisual display stream data, comprising audiovisual data recorded by the teleconference device audiovisual recording device, from each teleconference device. The computer transmits outbound audiovisual display stream data to one or more teleconference devices, and modulates the outbound audiovisual display stream data in response to user perspective data transmitted to the computer by the one or more teleconference devices.

20 Claims, 5 Drawing Sheets

(56) References Cited

U.S. PATENT DOCUMENTS

2019/0324646 A1* 10/2019 Homma ............. H04N 5/23229
2020/0099891 A1* 3/2020 Valli ................... H04N 13/111

* cited by examiner

ALWAYS-ON TELECONFERENCE COMMUNICATION HUB

CROSS-REFERENCE TO RELATED APPLICATIONS

The present disclosure is related to that disclosed in the U.S. Provisional Application No. 62/876,406, filed Jul. 19, 2019, entitled "Always-On Teleconference Communication Hub." U.S. Provisional Application No. 62/876,406 is assigned to the assignee of the present application. The subject matter disclosed in U.S. Provisional Application No. 62/876,406 is hereby incorporated by reference into the present disclosure as if fully set forth herein. The present invention hereby claims priority under 35 U.S.C. § 119(e) to U.S. Provisional Application No. 62/876,406.

TECHNICAL FIELD

The present disclosure relates generally to electronic teleconferencing systems and more specifically to always-on communication hubs to support simultaneous teleconferences between a plurality of teleconference devices.

BACKGROUND

Teleconference systems may utilize communication networks, including but not limited to the internet, to connect teleconference devices. Teleconference systems may permit teleconference devices to share visual imagery and audio data associated with a speaking user with other teleconference devices. However generating, connecting to, and disconnecting from high-fidelity teleconferences remains a complicated and time-consuming process, and teleconference systems may fail to account for and adjust teleconference imagery in response to user movement in order to approximate the subjective user experience of looking through a window instead of a teleconference device display screen.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary system and method to provide an always-on teleconference communication hub. Embodiments of the disclosed subject matter include two or more teleconference devices, each teleconference device operatively associated with at least one user and including an audiovisual recording device and an audiovisual display device, and a computer coupled with a database and including a processor and memory. The computer generates a teleconference space and transmits requests to join the teleconference space to the two or more teleconference devices. The computer stores in memory identification data for each of the two or more teleconference devices.

In embodiments of the disclosed subject matter, the computer receives inbound audiovisual display stream data, including audiovisual data recorded by the teleconference device audiovisual recording device, from each teleconference device. The computer transmits outbound audiovisual display stream data to one or more teleconference devices, and modulates the outbound audiovisual display stream data in response to user perspective data transmitted to the computer by the one or more teleconference devices.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
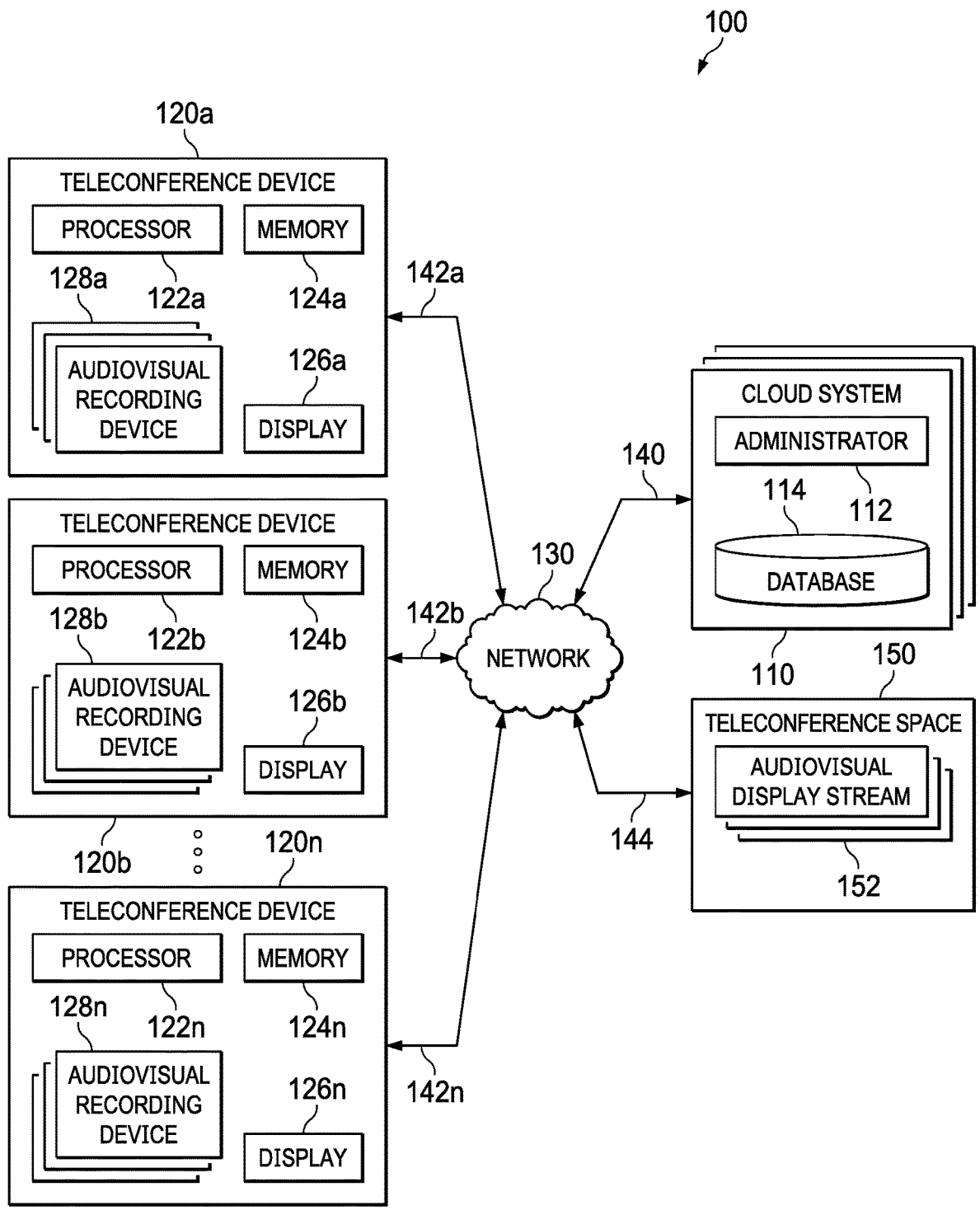
FIG. 1 illustrates an exemplary teleconference system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, embodiments of the following disclosure provide an always-on communication hub to facilitate teleconferences between a plurality of teleconference devices. Embodiments of the following disclosure generate a teleconference space between a plurality of teleconference devices. Each teleconference device is associated with an individual or group of users. Each teleconference device utilizes one or more associated audiovisual recording devices to record visual and/or audio data of the users associated with the teleconference device, and transmits the visual and/or audio data to other teleconference devices participating in the teleconference space. Each teleconference device utilizes one or more audiovisual recording devices to monitor the in-room location and current perspective of one or more users associated with each teleconference device. Embodiments modulate the visual data transmitted to two or more teleconference devices based on changes in user perspective, as described in greater detail below.

Embodiments of the always-on communication hub allow teleconference devices to rapidly initiate, terminate, and switch between teleconferences. Embodiments also improve the teleconference user experience by modulating teleconference device display perspectives in response to changes in user perspective to simulate the effect of the user looking through a window and not a static teleconference display screen. Embodiments permit the rapid creation, use, and termination of a variety of simultaneous teleconferences within the teleconference space.

FIG. 1 illustrates exemplary teleconference system 100, according to a first embodiment. Teleconference system 100 comprises one or more cloud systems 110, two or more teleconference devices 120, network 130, communication links 140-144, and teleconference space 150. Although one or more cloud systems 110, teleconference devices 120a-120n, single network 130, communication links 140-144, and single teleconference space 150 are shown and described, embodiments contemplate any number of cloud systems 110, teleconference devices 120, networks 130, communication links 140-144, or teleconference spaces 150, according to particular needs.

In one embodiment, cloud system 110 comprises administrator 112 and database 114. Administrator 112 generates teleconference space 150 in which two or more teleconference devices 120 may participate. Database 114 comprises one or more databases 114 or other data storage arrangements at one or more locations local to, or remote from, cloud system 110. In one embodiment, database 114 is coupled with administrator 112 using one or more local area networks (LANs), metropolitan area networks (MANs), wide area networks (WANs), or network 130, such as, for example, the Internet, or any other appropriate wire line, wireless link, or any other communication links 140-144. Database 114 stores data that is made available to and may be used by administrator 112 according to the operation of teleconference system 100 described below. According to embodiments, administrator 112 hosts and runs one or more runtime processes associated with cloud system 110.

According to embodiments, each of two or more teleconference devices 120 comprises processor 122 and memory 124. Processor 122 may execute an operating system program stored in memory 124 to control the overall operation of teleconference device 120. For example, processor 122 may control the reception of signals and the transmission of signals within teleconference system 100. Processor 122 may execute other processes and programs resident in memory 124, such as, for example, registration, identification or communication over communication links 140-144, and moving data into or out of memory 124, as required by an executing process.

According to embodiments, one or more users may be associated with each teleconference device 120. Each of the one or more users may comprise, for example, an individual person or customer, one or more employees or teams of employees within a business, or any other individual, person, or group of persons that communicates or otherwise interacts with one or more other teleconference devices 120.

Each teleconference device 120 comprises display 126 operatively associated with processor 122 and memory 124 of teleconference device 120. Display 126 may comprise an audiovisual display device, such as, for example, an electronic liquid crystal display (LCD) and one or more speakers. In an embodiment, each of one or more teleconference devices 120 may include an LCD comprising a diagonally-measured diameter of 55 inches or greater in 16:9 proportion, and a pixel resolution of 1,920×1,080 pixels or greater. In another embodiment, display 126 may comprise a pixel resolution of 3,840×2,160 pixels, a 4K resolution or greater. Teleconference device 120 processor 122 may display one or more audiovisual display streams 152 using teleconference device 120 display 126 and speakers.

Each teleconference device 120 comprises one or more audiovisual recording devices 128 operatively associated with processor 122 and memory 124 of teleconference device 120. Each audiovisual recording device 128 may comprise a camera, a microphone, and/or a camera and a microphone. One or more audiovisual recording devices 128 may record audiovisual data, comprising visual data and/or audio data, of one or more users associated with each teleconference device 120. Teleconference device 120 may transmit audiovisual data to one or more cloud systems 110 and/or other teleconference devices 120 participating in teleconference space 150, and may receive inbound audiovisual data transmitted by one or more cloud systems 110 and/or other teleconference devices 120 participating in teleconference space 150, over network 130 and communication links 140-144. Teleconference device 120 may display inbound audiovisual data using teleconference device 120 display 126 and speakers, as described in greater detail below.

In an embodiment, each teleconference device 120 may comprise single audiovisual recording device 128, comprising a microphone and a camera configured with at least a 180-degree field-of-view lens. The camera may use the 180-degree field-of-view lens to record visual information regarding the location in which teleconference device 120 is situated (such as, by way of example only and not by way of limitation, the room in which teleconference device 120 has been placed and the estimated dimensions of the room). Teleconference device 120 may transmit visual information regarding the location in which teleconference device 120 is situated to cloud system 110. In other embodiments, teleconference device 120 may utilize multiple audiovisual recording devices 128, each of which comprises a camera configured with at least a 90-degree field-of-view lens, to record visual information regarding the location in which teleconference device 120 is situated. Although particular audiovisual recording devices 128 are discussed herein, embodiments contemplate audiovisual recording devices 128 of various configurations and placements, according to particular needs.

Each teleconference device 120 may be coupled with other teleconference devices 120, as well as one or more cloud systems 110, by network 130 via communication link 142. Although communication links 142a-142n are shown connecting each teleconference device 120, respectively, to network 130, embodiments contemplate any number of communication links 140-144 connecting any number of teleconference devices 120 with network 130, according to particular needs. In addition, or as an alternative, communication links 140-144 may connect one or more teleconference devices 120 directly to one or more cloud systems 110 and/or one or more other teleconference devices 120.

According to embodiments, one or more communication links 140-144 couple one or more cloud systems 110, including cloud system 110 administrator 112 and database 114, and one or more teleconference devices 120 with network 130 and teleconference space 150. Each communication link 140-144 may comprise any wireline, wireless, or other link suitable to support data communications between one or more cloud systems 110, one or more teleconference devices 120, and network 130 and teleconference space 150. Although communication links 140-144 are shown as generally coupling one or more cloud systems 110 and one or more teleconference devices 120 with network 130 and teleconference space 150, one or more cloud systems 110 and one or more teleconference devices 120 may communicate directly with each other according to particular needs.

According to embodiments, network 130 includes the Internet, telephone lines, any appropriate LANs, MANs, or WANs, and any other communication network 130 coupling one or more cloud systems 110 and one or more teleconference devices 120. For example, data may be maintained by one or more cloud systems 110 at one or more locations external to one or more cloud systems 110, and made available to one or more cloud systems 110 or one or more teleconference devices 120 using network 130, or in any other appropriate manner.

According to embodiments, one or more cloud systems 110 and/or one or more teleconference devices 120 may each operate on one or more computers that are integral to or other from the hardware and/or software that supports teleconference system 100. As used herein, the computer, the term "computer," and "computer system" comprise an input device and an output device. The computer input device includes any suitable input device, such as a keypad, mouse, touch screen, microphone, or other device to input information. The computer output device comprises any suitable output device that may convey information associated with the operation of teleconference system 100, including digital or analog data, visual information, or audio information. Furthermore, the one or more computers include any suitable fixed or removable non-transitory computer-readable storage media, such as magnetic computer disks, CD-ROMs, or other suitable media to receive output from and provide input to teleconference system 100. The one or more computers also include one or more processors 122 and associated memory 124 to execute instructions and manipulate information according to the operation of teleconference system 100.

Embodiments contemplate one or more cloud systems 110 generating teleconference space 150. Each teleconference device 120 may connect to one or more cloud systems 110 using network 130 and communication links 140-144, and may participate in teleconference space 150. Teleconference space 150 allows two or more teleconference devices 120 to conduct and participate in one or more audiovisual teleconferences. Teleconference space 150 may comprise one or more audiovisual display streams 152. Each teleconference device 120 participating in teleconference space 150 may record audiovisual display stream 152, comprising visual data and/or audio data, of the users associated with teleconference device 120. Each teleconference device 120 may transmit the recorded audiovisual display stream 152 to cloud system 110.

In an embodiment, one or more cloud systems 110 may function as an always-on communication hub by transmitting audiovisual display streams 152 to specific teleconference devices 120 participating in a particular teleconference within teleconference space 150. For example, in an embodiment, two teleconference devices 120 (in this example, "Device A" and "Device B") connect to cloud system 110 to conduct a teleconference between Device A and Device B. Device A and Device B each record audiovisual display stream 152 using one or more associated audiovisual recording devices 128, and transmit audiovisual display stream 152 to cloud system 110. Cloud system 110 transmits Device A audiovisual display stream 152 to Device B, and transmits Device B audiovisual display stream 152 to Device A. Device A displays the Device B audiovisual display stream 152 on Device A's display 126. Device B displays the Device A audiovisual display stream 152 on Device B's display 126. The foregoing example is provided for illustrative purposes only, and embodiments contemplate any number of teleconference devices 120 connecting to any number of cloud systems 110 to participate in one or more teleconferences, according to particular needs.

According to embodiments, one or more cloud systems 110 may permit each teleconference device 120 to initiate and terminate teleconferences with other teleconference devices 120 within an always-on teleconference space 150. By way of example and not by way of limitation, in an embodiment, three teleconference devices 120 (in this example, "Device A," "Device B," and "Device C") connect to cloud system 110. Device A and Device B initiate a teleconference between Device A and Device B in the manner described above. In this example, when the teleconference between Device A and Device B concludes, Device A subsequently initiates a teleconference with Device C, in the manner described above. One or more cloud systems 110 may permit each teleconference device 120 to initiate and terminate teleconferences with other teleconference devices 120 participating in teleconference space 150 quickly and easily.

Each teleconference device 120 may utilize one or more audiovisual recording devices 128 to record the in-room location and current perspective of one or more users associated with teleconference device 120. Each teleconference device 120 may transmit the in-room location and current perspective of one or more users to cloud system 110. Cloud system 110 may utilize the in-room location and current perspective of one or more users to modulate the perspective of the audiovisual display streams 152 transmitted to each teleconference device 120 participating in teleconference space 150, as described in greater detail below. Cloud system 110 may modulate the audiovisual display streams 152 transmitted to two or more teleconference devices 120 to approximate, for one or more users interacting with the one or more teleconference device 120 displays 126, the subjective impression of looking through a window rather than at teleconference device 120 display 126, wherein the perspective displayed on teleconference device 120 display 126 changes as the user moves about the room and changes the angle from which the user views teleconference device 120 display 126.

Figure 2:
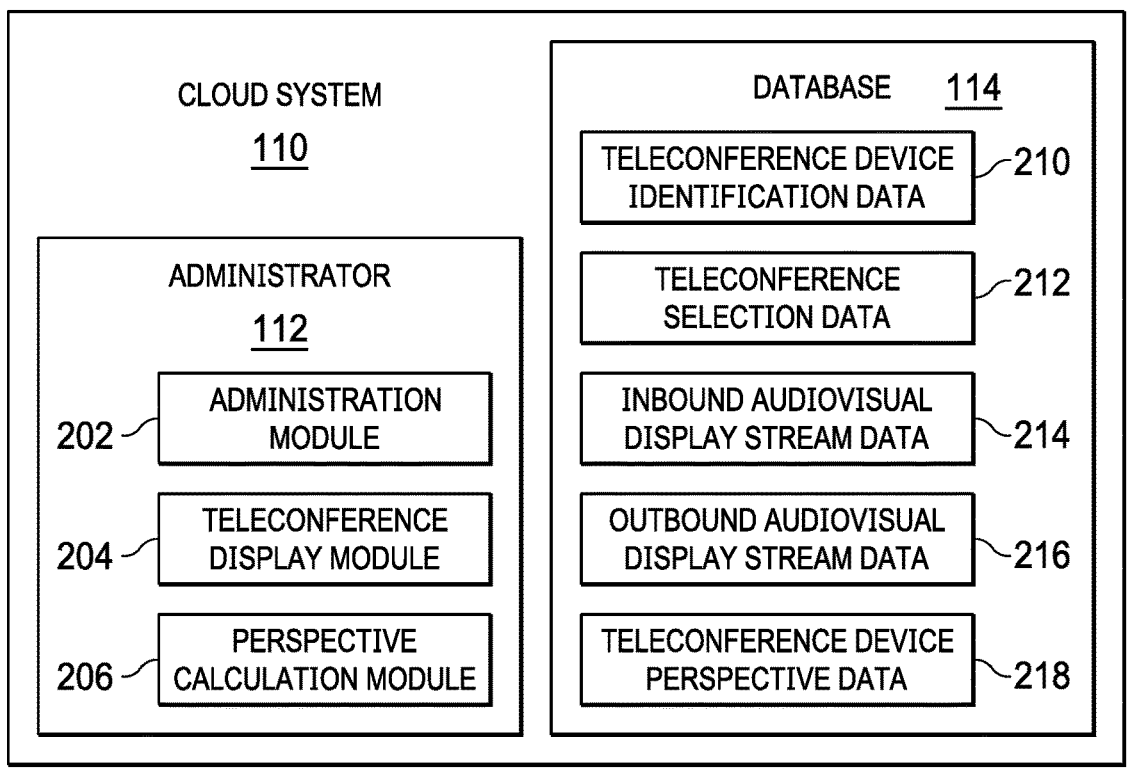
FIG. 2 illustrates the cloud system of FIG. 1 in greater detail, according to an embodiment.

FIG. 2 illustrates cloud system 110 of FIG. 1 in greater detail, according to an embodiment. In an embodiment, cloud system 110 may comprise one or more computers at one or more locations including associated input devices, output devices, non-transitory computer-readable storage media, processors, memory, or other components to send and receive information between one or more teleconference devices 120 according to the operation of teleconference system 100. In addition, cloud system 110 comprises administrator 112 and database 114. Although cloud system 110 is described as comprising single administrator 112 and database 114, embodiments contemplate any suitable number of administrators 112 or databases 114 internal to or externally coupled with cloud system 110. In addition, or as an alternative, cloud system 110 may be located internal to one or more teleconference devices 120.

According to embodiments, administrator 112 comprises administration module 202, teleconference display module 204, and perspective calculation module 206. Although a particular configuration of administrator 112 is shown and described, embodiments contemplate any suitable number or combination of administration modules 202, teleconference display modules 204, perspective calculation modules 206, and/or other modules located at one or more locations, local to, or remote from, cloud system 110, according to particular needs. In addition, or as an alternative, administration module 202, teleconference display module 204, and perspective calculation module 206 may be located on multiple administrators 112 or computers at any location in teleconference system 100.

Database 114 may comprise teleconference device identification data 210, teleconference selection data 212, inbound audiovisual display stream data 214, outbound audiovisual display stream data 216, and teleconference device perspective data 218. Although database 114 is shown and described as comprising teleconference device identification data 210, teleconference selection data 212, inbound audiovisual display stream data 214, outbound audiovisual display stream data 216, and teleconference device perspective data 218, embodiments contemplate any suitable number or combination of teleconference device identification data 210, teleconference selection data 212, inbound audiovisual display stream data 214, outbound audiovisual display stream data 216, teleconference device perspective data 218, and/or other data pertaining to teleconference system 100 located at one or more locations, local to, or remote from, cloud system 110, according to particular needs.

Administration module 202 of administrator 112 may configure, update, and/or manage the operation of cloud system 110. That is, administration module 202 may configure, update, and/or manage the broader operation of teleconference system 100 and change which data is executed and/or stored on one or more cloud systems 110 and/or one or more teleconference devices 120. Teleconference system 100 may comprise a user-configurable system, such that cloud system 110 administrator 112 may store teleconference device identification data 210, teleconference selection data 212, inbound audiovisual display stream data 214, outbound audiovisual display stream data 216, and/or teleconference device perspective data 218 either singularly or redundantly in cloud system 110 database 114 and/or one or more teleconference devices 120, according to particular needs. According to other embodiments, administration module 202 monitors, processes, updates, creates, and stores teleconference device identification data 210, teleconference selection data 212, inbound audiovisual display stream data 214, outbound audiovisual display stream data 216, and/or teleconference device perspective data 218 in cloud system 110 database 114, as discussed in greater detail below.

According to embodiments, administration module 202 of administrator 112 may generate teleconference space 150, which one or more teleconference devices 120 may join. When teleconference device 120 joins teleconference space 150, administration module 202 may record unique identifying information regarding teleconference device 120, such as by assigning teleconference device 120 a unique ID or by recording teleconference device 120's IP or MAC address, in teleconference device identification data 210 of database 114, as is further described below.

Teleconference display module 204 of administrator 112 generates one or more outbound audiovisual display streams 152, which administration module 202 transmits to one or more teleconference devices 120 using network 130 and one or more communication links 140-144. More specifically, teleconference display module 204 accesses inbound audiovisual display stream data 214 stored in cloud system 110 database 114 and uses inbound audiovisual display stream data 214, teleconference selection data 212, and/or teleconference device perspective data 218 to generate one or more outbound audiovisual display streams 152. Teleconference display module 204 stores one or more outbound audiovisual display streams 152 in outbound audiovisual display stream data 216 of cloud system 110 database 114. Administration module 202 accesses one or more outbound audiovisual display streams 152 stored in outbound audiovisual display stream data 216, and transmits one or more outbound audiovisual display streams 152 to one or more teleconference devices 120 participating in teleconference space 150. Teleconference display module 204 stores and retrieves data from cloud system 110 database 114 including teleconference device identification data 210, teleconference selection data 212, inbound audiovisual display stream data 214, and/or teleconference device perspective data 218 in the process of generating one or more outbound audiovisual display streams 152. Teleconference display module 204 may generate different audiovisual displays 126 conveying different types of information for different teleconference devices 120.

According to embodiments, perspective calculation module 206 of administrator 112 accesses perspective data stored in teleconference device perspective data 218 of cloud system 110 database 114. Perspective data may comprise data pertaining to the in-room location and current perspective of one or more users associated with each of one or more teleconference devices 120. Perspective calculation module 206 analyzes the perspective data and transmits information to teleconference display module 204 regarding which portions of the one or more inbound audiovisual display streams 152, stored in inbound audiovisual display stream data 214, teleconference display module 204 should select to generate one or more outbound audiovisual display streams 152. By modulating which portions of the one or more inbound audiovisual display streams 152 teleconference display module 204 selects to generate one or more outbound audiovisual display streams 152, teleconference system 100 may generate one or more outbound audiovisual display streams 152 which move and adjust in response to the movement and perspective of one or more users and approximate the subjective impression of looking through a window. In an embodiment, perspective calculation module 206 continuously analyzes the perspective data, and transmits information to teleconference display module 204 regarding which portions of the one or more inbound audiovisual display streams 152 teleconference display module 204 should select, substantially in real time.

Teleconference device identification data 210 of database 114 comprises the identification data of one or more teleconference devices 120, such as, for example, names and addresses of the one or more users associated with each of one or more teleconference devices 120, company contact information, telephone numbers, email addresses, IP addresses, and the like. According to embodiments, identification data may also comprise information regarding the operating systems of each of one or more teleconference devices 120, internet browser information regarding each of one or more teleconference devices 120, or system specifications (such as, for example, processor 122 speed, available memory 124, hard drive space, and the like) for each of one or more teleconference devices 120.

Teleconference device identification data 210 may also include end user ID information, end user account information, end user personal identification number (PIN) information, teleconference device 120 ID information, teleconference device 120 MAC address information, or any other type of information which cloud system 110 may use to identify and track each of one or more teleconference devices 120 participating in teleconference space 150. Although particular teleconference device identification data 210 are described, embodiments contemplate any type of teleconference device identification data 210 associated with one or more teleconference devices 120 or teleconference devices 120, according to particular needs.

Teleconference selection data 212 of database 114 comprises information regarding which of teleconference devices 120 connected to one or more cloud systems 110 are currently participating in a teleconference. Teleconference selection data 212 further comprises identification data that identifies each of the one or more teleconferences in progress within teleconference space 150, and identifies each teleconference device 120 participating in each teleconference. For example, in an embodiment, six teleconference devices 120 (comprising in this example "Device A," "Device B," "Device C," "Device D," "Device E," and "Device F") connect to cloud system 110 to join teleconference space 150. Device A transmits a request to administration module 202 of cloud system 110 to initiate a teleconference with Device C. Device B transmits a request to administration module 202 to initiate a teleconference with Device F. Device D transmits a request to administration module 202 to initiate a teleconference with Device E. Cloud system 110 administration module 202 stores information identifying each of these three simultaneous teleconferences (wherein one of the three teleconferences comprises Device A and Device C as participants, one of the three teleconference comprises Device B and Device F as participants, and one of the three teleconferences comprises Device D and Device E as participants) in teleconference selection data 212. Although this example embodiment illustrates a particular configuration of teleconference devices 120 and possible teleconference combinations between teleconference devices 120, embodiments contemplate any number of teleconference devices 120 connecting to one or more cloud systems 110 to participate in any number of teleconferences, according to particular needs.

Inbound audiovisual display stream data 214 of database 114 comprises data related to the one or more inbound audiovisual display streams 152 transmitted to cloud system 110 by each of one or more teleconference devices 120. As described in greater detail below, each teleconference device 120 uses one or more associated audiovisual recording devices 128 to record audiovisual display stream 152, comprising visual data and/or audio data. Each teleconference device 120 transmits audiovisual display stream 152 to administration module 202 of cloud system 110. Administration module 202 stores each inbound audiovisual display stream 152, along with teleconference device identification data 210 which associates each inbound audiovisual display stream 152 with the specific teleconference device 120 that transmitted each inbound audiovisual display stream 152 to cloud system 110, in inbound audiovisual display stream data 214 of database 114.

Outbound audiovisual display stream data 216 of database 114 comprises data related to one or more outbound audiovisual display streams 152 that administration module 202 of cloud system 110 transmits to each teleconference device 120 participating in teleconference space 150. As described above, teleconference display module 204 may access inbound audiovisual display stream data 214, teleconference selection data 212, and/or teleconference device perspective data 218 to generate one or more outbound audiovisual display streams 152. Teleconference display module 204 stores one or more outbound audiovisual display streams 152, along with teleconference device identification data 210 associating each of one or more outbound audiovisual display streams 152 with the particular teleconference device 120 that will receive the outbound audiovisual display stream 152, in outbound audiovisual display stream data 216 of database 114. Administration module 202 of cloud system 110 accesses outbound audiovisual display stream data 216 and transmits each outbound audiovisual display stream 152 to teleconference device 120 associated with the particular outbound audiovisual display stream 152, as described in greater detail below.

Teleconference device perspective data 218 of database 114 may comprise perspective data regarding the in-room location and current perspective of one or more users associated with each teleconference device 120. As described in greater detail below, each teleconference device 120 may continuously monitor the in-room location and current perspective of one or more users and the perspective in the room from which the one or more users view teleconference device 120 display 126. Teleconference device 120 may transmit perspective data, comprising the in-room location and current perspective of the one or more users, to administration module 202 of cloud system 110. Administration module 202 may store, for each teleconference device 120, the perspective data of the one or more users associated with teleconference device 120 in teleconference device perspective data 218 of cloud system 110 database 114. Administration module 202 may also store teleconference device identification data 210, which associates each of the one or more perspective data with the specific teleconference device 120 that transmitted the perspective data to cloud system 110, in teleconference device perspective data 218.

Figure 3:
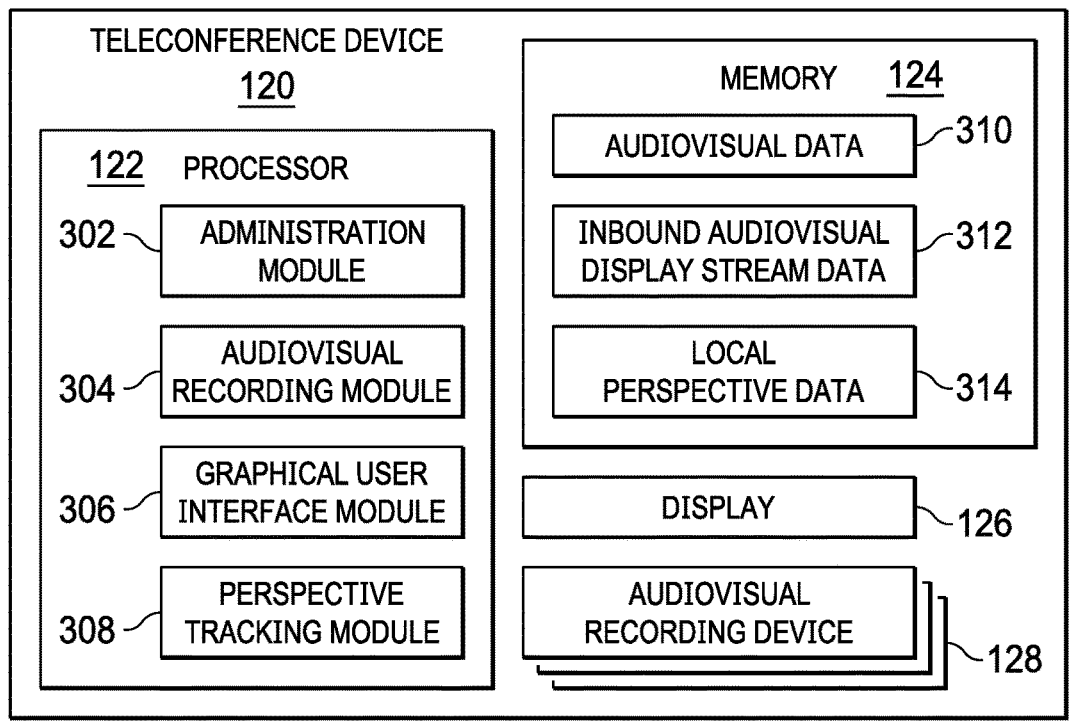
FIG. 3 illustrates an exemplary teleconference device of FIG. 1 in greater detail, according to an embodiment.

FIG. 3 illustrates exemplary teleconference device 120 of FIG. 1 in greater detail, according to an embodiment. As described above, teleconference device 120 may comprise processor 122, memory 124, display 126, and one or more audiovisual recording devices 128. Although teleconference device 120 is described as comprising a single processor 122, memory 124, display 126, and one or more audiovisual recording devices 128, embodiments contemplate any suitable number of processors 122, memory 124, displays 126, audiovisual recording devices 128, or other data storage and retrieval components internal to or externally coupled with teleconference device 120.

Teleconference device 120 processor 122 may comprise administration module 302, audiovisual recording module 304, graphical user interface module 306, and perspective tracking module 308. Although processor 122 is described as comprising single administration module 302, audiovisual recording module 304, graphical user interface module 306, and perspective tracking module 308, embodiments contemplate any suitable number of administration modules 302, audiovisual recording modules 304, graphical user interface modules 306, perspective tracking modules 308, and/or other modules, internal to or externally coupled with teleconference device 120. Processor 122 may execute an operating system program stored in memory 124 to control the overall operation of teleconference device 120. For example, processor 122 may control the reception of signals and the transmission of signals within teleconference system 100. Processor 122 may execute other processes and programs resident in memory 124, such as, for example, registration, identification or communication over network 130 and communication links 140-144.

Teleconference device 120 memory 124 may comprise audiovisual data 310, inbound audiovisual display stream data 312, and local perspective data 314. Although memory 124 is described as comprising audiovisual data 310, inbound audiovisual display stream data 312, and local perspective data 314, embodiments contemplate any suitable number of audiovisual data 310, inbound audiovisual display stream data 312, local perspective data 314, and/or other data, internal to or externally coupled with teleconference device 120, according to particular needs.

In an embodiment, administration module 302 of teleconference device 120 processor 122 may configure, update, and/or manage the operation of teleconference device 120. That is, administration module 302 may configure, update, and/or manage the broader operation of teleconference device 120 and change which data is executed and/or stored on teleconference device 120. Administration module 302 may transmit, using network 130 and communication links 140-144, audiovisual data 310 stored in teleconference device 120 memory 124, and local perspective data 314 stored in teleconference device 120 memory 124, to administration module 202 of one or more cloud systems 110. Administration module 202 of one or more cloud systems 110 may transmit an outbound audiovisual display stream 152 to administration module 302 of teleconference device 120 processor 122. Administration module 302 may store, in inbound audiovisual display stream data 312, audiovisual display stream 152 transmitted by administration module 202 of one or more cloud systems 110.

In an embodiment, audiovisual recording module 304 of teleconference device 120 processor 122 may be operatively associated with, and may monitor and facilitate the operation of, one or more audiovisual recording devices 128 of teleconference device 120. By way of example and not by way of limitation, audiovisual recording module 304 may activate one or more audiovisual recording devices 128, and may record audiovisual data 310, comprising visual data and/or audio data, of one or more users associated with teleconference device 120. In an embodiment, audiovisual recording module 304 may transmit this audiovisual data 310 directly to cloud system 110 administration module 202, using network 130 and one or more communication links 140-144.

Audiovisual recording module 304 may also store audiovisual data 310 in audiovisual data 310 of teleconference device 120 memory 124. According to embodiments, audiovisual data 310 may comprise visual information, such as a video file or real-time visual stream, or one or more individual image snapshots, of one or more users associated with teleconference device 120. Audiovisual data 310 may store time entry information with the video file, real-time visual stream, or one or more individual image snapshots, enabling teleconference device 120 processor 122 to determine when audiovisual recording module 304 captured and stored the associated visual information in audiovisual data 310. Audiovisual data 310 may also comprise audio information, such as recorded audio of one or more speaking users. Although particular examples of audiovisual data 310 are described herein, embodiments contemplate audiovisual recording module 304 storing any form of audiovisual data 310, including but not limited to data that is exclusively visual in nature or data that is exclusively audio in nature, in audiovisual data 310 of teleconference device 120 memory 124.

According to embodiments, graphical user interface module 306 of teleconference device 120 processor 122 generates a graphical user interface display comprising and displaying features of the inbound audiovisual display stream 152 stored in inbound audiovisual display stream data 312 of teleconference device 120 database 114. In an embodiment, graphical user interface module 306 accesses inbound audiovisual display stream data 312 and displays the inbound audiovisual display stream 152 using teleconference device 120 display 126. Graphical user interface module 306 may generate different graphical user interface displays 126 conveying different types of information about teleconference space 150 and the teleconference and transcript views, according to embodiments.

According to embodiments, inbound audiovisual display stream data 312 comprises data related to audiovisual display stream 152 that administration module 202 of cloud system 110 transmits to teleconference device 120 participating in teleconference space 150. As described above, administration module 202 of cloud system 110 transmits outbound audiovisual display stream 152 to each teleconference device 120 participating in teleconference space 150. Administration module 302 of teleconference device 120 processor 122 stores audiovisual display stream 152 transmitted by cloud system 110 administration module 202 in inbound audiovisual display stream data 312.

Perspective tracking module 308 of teleconference device 120 utilizes one or more audiovisual recording devices 128 associated with teleconference device 120 to record the in-room location and current perspective of one or more users associated with teleconference device 120. By way of example and not by way of limitation, in an embodiment, perspective tracking module 308 first records visual information regarding the room in which teleconference device 120 is situated. Perspective tracking module 308 uses the room visual information to estimate the size of the room and the position and orientation of teleconference device 120 in the room. Continuing the example, perspective tracking module 308 next identifies the face of a user associated with teleconference device 120. Perspective tracking module 308 compares the size of the user face with the estimated size of the room to estimate the distance from teleconference device 120 to the user. Perspective tracking module 308 also analyzes the off-center angle measured from teleconference device 120 audiovisual recording device 128 to the user face to estimate the location of the user in the room relative to teleconference device 120. Although particular methods by which perspective tracking module 308 and audiovisual recording device 128 may record the in-room location and current perspective of one or more users are described herein, embodiments contemplate perspective tracking module 308 utilizing any methods to record the in-room location and current perspective of one or more users, according to particular needs. In an embodiment, perspective tracking module 308 continuously records the in-room location and current perspective of one or more users substantially in real time, and records the in-room location and current perspective of one or more users in local perspective data 314 of teleconference device 120 memory 124.

Teleconference device 120 memory 124 local perspective data 314 comprises data related to the in-room location and current perspective of one or more users associated with teleconference device 120. Local perspective data 314 may store perspective data of one or more users in any format, including but not limited to a two-dimensional map illustrating the estimated layout of the room and the current location of the user with respect to the room topography. Administration module 302 of teleconference device 120 may access local perspective data 314, and may transmit local perspective data 314 to administration module 202 of cloud system 110, substantially in real time.

Figure 4:
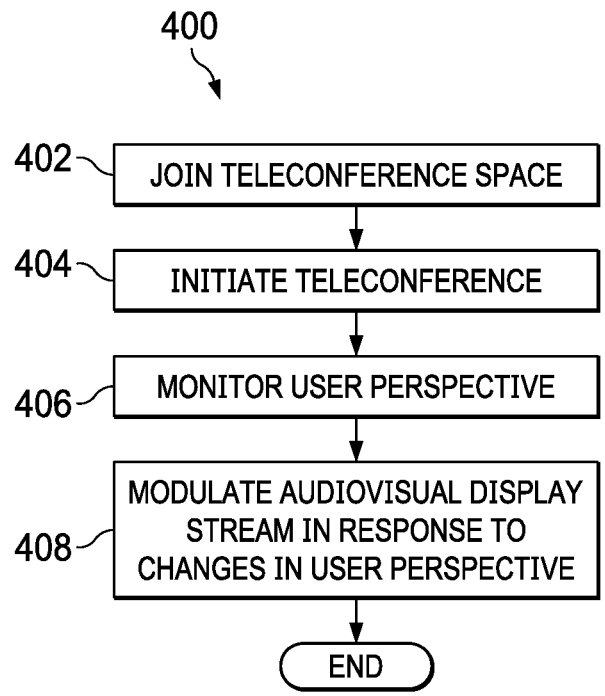
FIG. 4 illustrates an exemplary method of providing an always-on teleconference communication hub, according to an embodiment.

FIG. 4 illustrates exemplary method 400 of providing an always-on teleconference communication hub, according to an embodiment. Method 400 proceeds by one or more actions, which although described in a particular order may be performed in one or more other permutations, according to particular needs. In an embodiment, the actions may comprise: joining teleconference space 150 as action 402, initiating a teleconference within teleconference space 150 as action 404, monitoring user perspective as action 406, and modulating one or more teleconference space 150 audiovisual display streams 152 in response to changes in user perspective as action 408.

At action 402 of FIG. 4, administration module 202 of cloud system 110 database 114 generates teleconference space 150 for one or more teleconference devices 120 to join. Administration modules 302 of teleconference devices 120 transmit requests to administration module 202 of cloud system 110 to join teleconference space 150. Administration module 202 of cloud system 110 accepts the requests to join teleconference space 150 from teleconference devices 120, and teleconference devices 120 join teleconference space 150. Administration module 202 records unique identifying information regarding each teleconference device 120, such as by assigning to each teleconference device 120 a unique ID and by recording the IP or MAC addresses of each teleconference device 120, in teleconference device identification data 210.

In an embodiment, for each participating teleconference device 120, audiovisual recording module 304 of teleconference device 120 activates audiovisual recording device 128 camera and microphone, and records audiovisual data 310, comprising audio data and visual data comprising a view of the room in which teleconference device 120 is situated. Audiovisual recording module 304 stores audiovisual data 310 in audiovisual data 310. Administration module 302 accesses audiovisual data 310, and transmits audiovisual data 310 as audiovisual display stream 152 to administration module 202 of cloud system 110. Administration module 202 stores inbound audiovisual display stream 152 from each teleconference device 120 in inbound audiovisual display stream data 214 of cloud system 110 database 114. Administration module 202 of cloud system 110 also stores teleconference device identification data 210 identifying the inbound audiovisual display stream 152 of each participating teleconference device 120 in inbound audiovisual display stream data 214.

At action 404, teleconference devices 120 initiate a teleconference. In an embodiment, one teleconference device 120 may transmit a request to administration module 202 of cloud system 110 to initiate a teleconference with one or more separate teleconference device 120. Administration module 202 transmits an invitation to administration module 302 of one or more separate teleconference device 120 to join a teleconference. Administration module 302 of one or more separate teleconference devices 120 transmits an acceptance of the invitation to administration module 202. Administration module 202 stores information identifying particular teleconference devices 120 participating in the teleconference in teleconference selection data 212 of cloud system 110 database 114. Teleconference display module 204 uses teleconference device identification data 210 and teleconference selection data 212 to select which portions of the inbound audiovisual display streams 152 stored in inbound audiovisual display stream data 214 will constitute the outbound audiovisual display streams 152 cloud system 110 will transmit to the teleconference devices 120 participating in the teleconference, as described in greater detail in the expanded example below. Administration module 202 transmits a specific outbound audiovisual display stream 152 to each teleconference device 120 participating in the teleconference. Administration module 302 of each teleconference device 120 stores outbound audiovisual display stream 152 in inbound audiovisual display stream data 312 of each teleconference device 120 memory 124. Graphical user interface module 306 of each teleconference device 120 accesses inbound audiovisual display stream data 312, and displays the data 310 contained therein on teleconference device 120 display 126, illustrated by FIG. 6.

At action 406, each teleconference device 120 monitors the in-room location and current perspective of one or more associated users. Teleconference device 120 perspective tracking module 308 uses audiovisual recording device 128 camera to record a view of the room in which teleconference device 120 is operating. Perspective tracking module 308 of teleconference device 120 uses the room visual information to estimate the size of the room and the position and orientation of teleconference device 120 within the room. Perspective tracking module 308 next identifies the face of one or more users associated with teleconference device 120. Perspective tracking module 308 compares the size of one or more user faces with the estimated size of the room to estimate the distance from teleconference device 120 to one or more users. Perspective tracking module 308 also analyzes the off-center angle measured from the camera of teleconference device 120 to one or more user faces to estimate the location of one or more users in relation to teleconference device 120. Administration module 302 transmits local perspective data 314 of one or more teleconference device 120 users to administration module 202 of cloud system 110. Administration module 202 stores local perspective data 314 of one or more teleconference device 120 users in teleconference device perspective data 218 of cloud system 110 database 114.

At action 408, cloud system 110 modulates one or more teleconference space 150 audiovisual display streams 152 in response to changes in user perspective. Perspective calculation module 206 of cloud system 110 selects different portions of one or more inbound audiovisual display streams 152 to comprise one or more outbound audiovisual display streams 152, according to particular needs and as described in greater detail in the expanded example below. Teleconference system 100 terminates method 400 when all teleconference devices 120 exit teleconference space 150.

In order to illustrate the operation of providing an always-on teleconference communication hub, an expanded example is now provided. In the following example, exemplary teleconference system 502 comprises cloud system 110, two teleconference devices 120 (henceforth, "Device 504" and "Device 506"), network 130, and three communication links 140-142*b*. Although a particular number of cloud systems 110, teleconference devices 120, networks 130, and communication links 140-142b are shown and described, embodiments contemplate any number of cloud systems 110, teleconference devices 120, networks 130, or communication links 140-144, according to particular needs.

Figure 5:
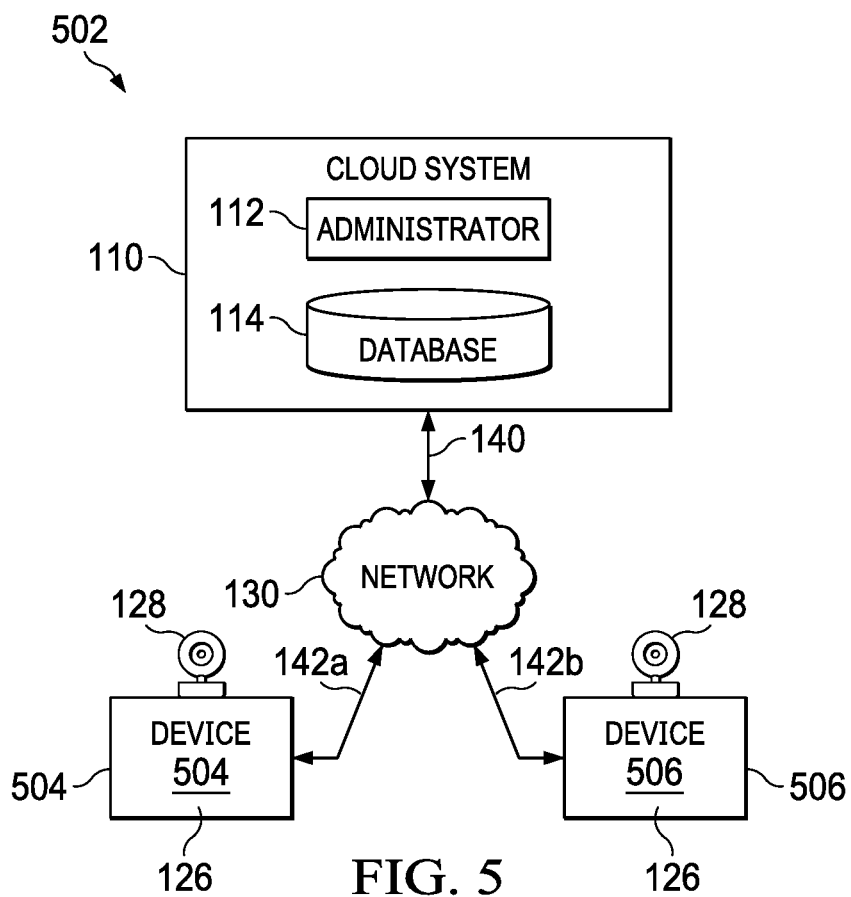
FIG. 5 illustrates an exemplary teleconference system executing the method of FIG. 4, according to an embodiment.

FIG. 5 illustrates exemplary teleconference system 502 executing method 400 of FIG. 4, according to an embodiment. Continuing the example, each of the two teleconference devices 120, Device 504 and Device 506, comprises processor 122, memory 124, display 126, and a single audiovisual recording device 128. In this example, display 126 comprises a 55-inch 16:9 LCD with a pixel resolution of 3,840×2,160 pixels (4K resolution). Audiovisual recording device 128 comprises a single camera and microphone, mounted to the top center of Device 504 and Device 506 display 126. In this example, the camera is configured with a 180-degree field-of view lens, which allows the camera to view the rooms in which Device 504 and Device 506 are respectively situated. Additionally, in this example, a single user (henceforth, user 602) is associated with Device 504, and two users (henceforth, users 604) are associated with Device 506, illustrated by FIG. 6. Although teleconference devices 120 of this example are described comprising a particular display 126 and audiovisual recording device 128 configuration, and being associated with a particular number of users 602-604, embodiments contemplate teleconference devices 120 comprising any number and configuration of displays 126 and audiovisual recording devices 128, and being associated with any number of users, according to particular needs.

Continuing the example, at action 402 of FIG. 4, administration module 202 of cloud system 110 database 114 generates teleconference space 150. Administration modules 302 of Device 504 and Device 506 transmit requests to administration module 202 of cloud system 110 to join teleconference space 150. Administration module 202 of cloud system 110 accepts the requests to join teleconference space 150 from Device 504 and Device 506, and Device 504 and Device 506 join teleconference space 150. Administration module 202 records unique identifying information regarding Device 504 and Device 506, such as by assigning to Device 504 and Device 506 unique IDs and by recording the IP or MAC addresses of Device 504 and Device 506, in teleconference device identification data 210.

Continuing the example, audiovisual recording module 304 of Device 504 activates Device 504 audiovisual recording device 128 camera and microphone, and records audiovisual data 310, comprising audio data and visual data comprising a 180-degree field of view of the room in which Device 504 is situated. Audiovisual recording module 304 of Device 504 stores audiovisual data 310 in audiovisual data 310 of Device 504 memory 124. Administration module 302 of Device 504 accesses audiovisual data 310 stored in Device 504 memory 124, and transmits audiovisual data 310 as audiovisual display stream 152 to administration module 202 of cloud system 110. Administration module 202 stores the inbound audiovisual display stream 152 of Device 504, comprising a 180-degree field of view of the room in which Device 504 is situated, in inbound audiovisual display stream data 214 of cloud system 110 database 114. Administration module 202 of cloud system 110 also stores teleconference device identification data 210 associating the inbound audiovisual display stream 152 of Device 504 with Device 504 in inbound audiovisual display stream data 214.

Device 506 executes the actions described above with respect to Device 504 to transmit Device 506 audiovisual display stream 152, comprising audio data and visual data comprising a 180-degree field of view of the room in which Device 506 is situated, to administration module 202 of cloud system 110. Administration module 202 stores the inbound audiovisual display stream 152 of Device 506, comprising a 180-degree field of view of the room in which Device 506 is situated, in inbound audiovisual display stream data 214 of cloud system 110 database 114. Administration module 202 also stores teleconference device identification data 210 associating the inbound audiovisual display stream 152 of Device 506 with Device 506 in inbound audiovisual display stream data 214.

Continuing the example, at action 404, Device 504 and Device 506 initiate a teleconference between Device 504 and Device 506. In this example, Device 504 transmits a request to administration module 202 of cloud system 110 to initiate a teleconference with Device 506. Administration module 202 transmits an invitation to administration module 302 of Device 506 to join a teleconference with Device 504. Administration module 302 of Device 506 transmits an acceptance of the invitation to administration module 202. Administration module 202 stores information identifying the in-process Device 504-Device 506 teleconference in teleconference selection data 212 of cloud system 110 database 114.

Continuing the example, teleconference display module 204 of cloud system 110 database 114 accesses the identification data stored in teleconference device identification data 210, as well as the information identifying Device 504-Device 506 teleconference stored in teleconference selection data 212. Teleconference display module 204 uses teleconference device identification data 210 and teleconference selection data 212 to select which portions of the inbound audiovisual display streams 152 of Device 504 and Device 506, stored in inbound audiovisual display stream data 214, will constitute the outbound audiovisual display streams 152 of Device 504-Device 506 teleconference. In other embodiments in which teleconference system 100 supports separate teleconferences between a plurality of teleconference device 120 pairs simultaneously, teleconference display module 204 may utilize teleconference selection data 212 to select which outbound audiovisual display stream 152 administration module 202 of cloud system 110 will transmit to each teleconference device 120, according to particular needs.

Figure 6:
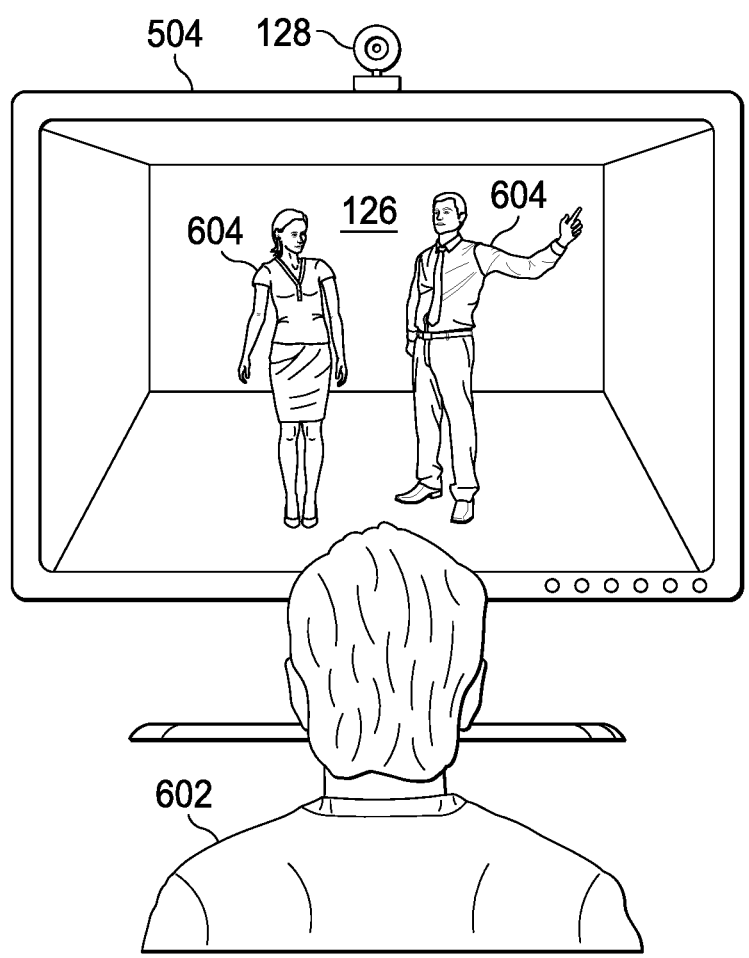
FIG. 6 illustrates a teleconference device participating in a teleconference with a second teleconference device, according to an embodiment.
Figure 7:
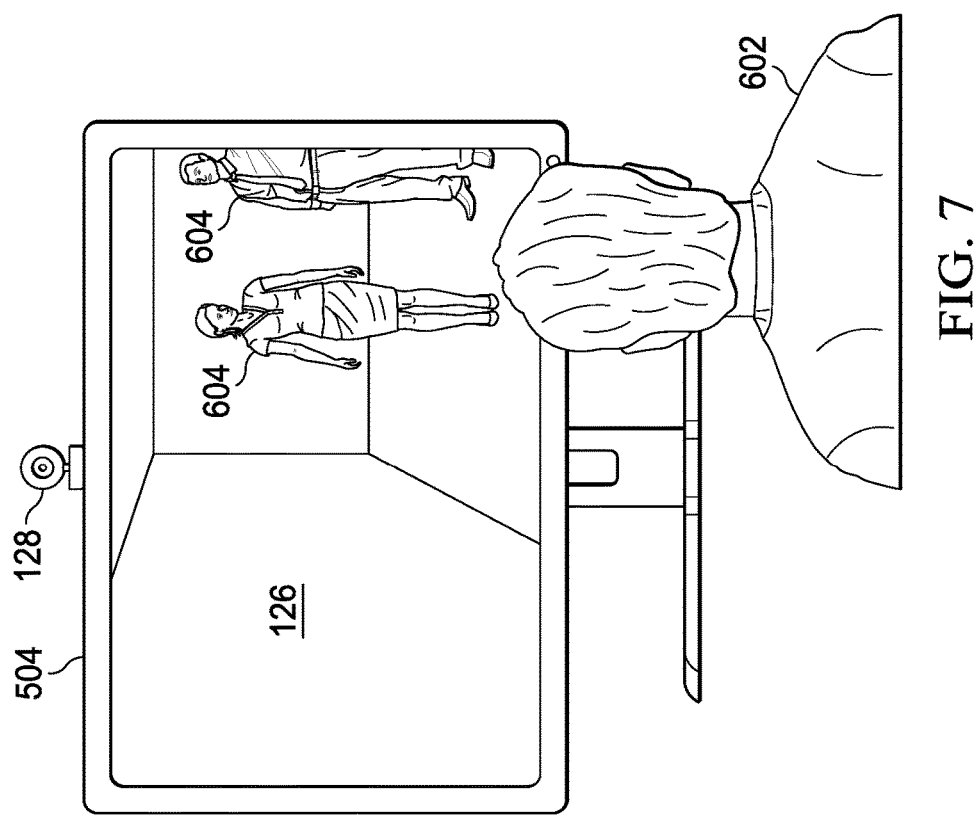
FIG. 7 illustrates a second configuration of a teleconference device participating in a teleconference with a second teleconference device, according to an embodiment.
Figure 8:
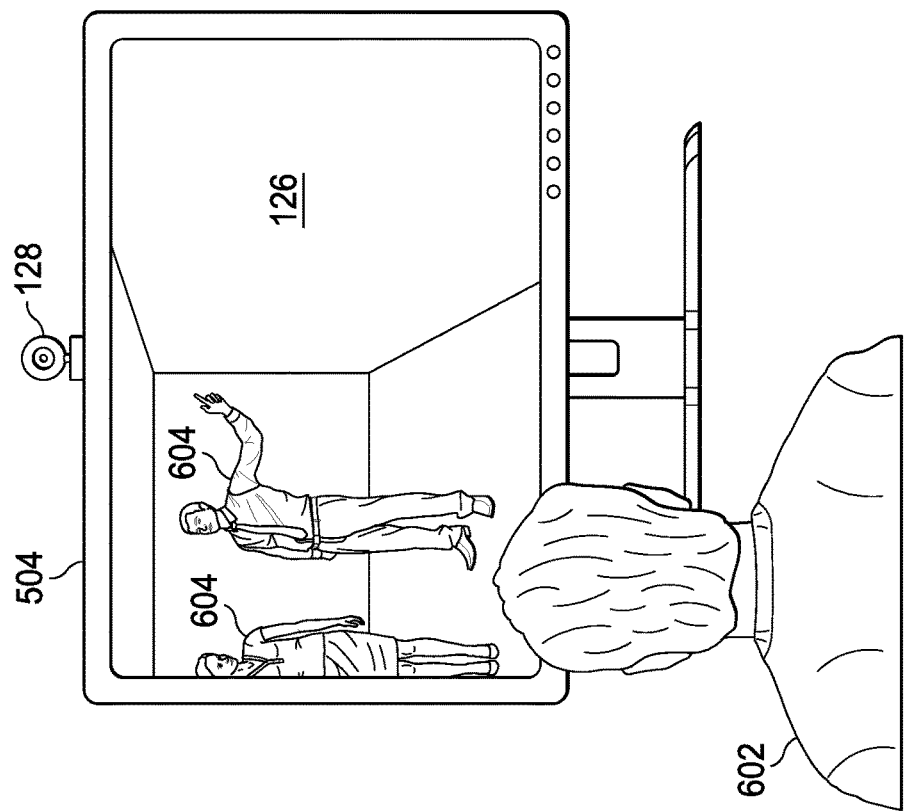
FIG. 8 illustrates a third configuration of a teleconference device participating in a teleconference with a second teleconference device, according to an embodiment.

Continuing the example, teleconference display module 204 accesses teleconference device identification data 210 and teleconference selection data 212, and determines there is currently a single teleconference in progress, between Device 504 and Device 506. Teleconference display module 204 accesses teleconference device perspective data 218 and Device 504 audiovisual display stream 152 and Device 506 audiovisual display stream 152, stored in inbound audiovisual display stream data 214 of cloud system 110 database 114. Teleconference display module 204 generates two outbound audiovisual display streams 152. Device 504 outbound audiovisual display stream 152, which administration module 202 of cloud system 110 will transmit to Device 504, comprises in this example selection portions of audiovisual display stream 152 that Device 506 previously transmitted to cloud system 110. More specifically, teleconference display module 204 accesses Device 506 inbound audiovisual display stream 152 and selects the audio data stored therein, and a narrowed, central field of view portion of the original 180-degree view of the room in which Device 506 is situated, to comprise Device 504 outbound audiovisual display stream 152. Similarly, teleconference display module 204 accesses Device 504 inbound audiovisual display stream 152 and selects the audio data stored therein, and a narrowed, central field of view portion of the original 180-degree view of the room in which Device 504 is situated, to comprise Device 506 outbound audiovisual display stream 152. By initially choosing the narrowed, central field of view portions of the original Device 504 and Device 506 inbound audiovisual display streams 152, illustrated in FIG. 6, teleconference display module 204 and perspective calculation module 206 will subsequently be able to "pan" the outbound audiovisual display streams 152 to other portions of the original 180-degree inbound audiovisual display streams 152 in response to user movement and/or changes in user perspective to simulate the subjective experience of looking through a window, as illustrated in FIGS. 7 and 8.

Teleconference display module 204 stores Device 504 outbound audiovisual display stream 152 and Device 506 outbound audiovisual display stream 152 in outbound audiovisual display stream data 216 of database 114. Administration module 202 of cloud system 110 accesses outbound audiovisual display stream data 216, and transmits Device 504 outbound audiovisual display stream 152 to administration module 302 of Device 504. Similarly, administration module 202 transmits Device 506 outbound audiovisual display stream 152 to administration module 302 of Device 506.

Administration module 302 of Device 504 stores Device 504 outbound audiovisual display stream 152, transmitted from cloud system 110 to Device 504, in inbound audiovisual display stream data 312 of Device 504 memory 124. Graphical user interface module 306 of Device 504 accesses inbound audiovisual display stream data 312, and displays the data contained therein on Device 504 display 126, as illustrated by FIG. 6. Simultaneously, administration module 302 of Device 506 stores Device 506 outbound audiovisual display stream 152, transmitted from cloud system 110 to Device 506, in inbound audiovisual display stream data 312 of Device 506 memory 124. Graphical user interface module 306 of Device 506 accesses inbound audiovisual display stream data 312, and displays the data contained therein on Device 506 display 126.

FIG. 6 illustrates Device 504 participating in a teleconference with Device 506, according to an embodiment. Continuing the example, Device 504 displays on Device 504 LCD display 126 the audiovisual information contained in Device 504 outbound audiovisual display stream 152 that administration module 202 of cloud system 110 transmitted to Device 504. In this example, Device 504 displays on Device 504 LCD display 126 the narrowed, central field of view portion of the original 180-degree view of the room in which Device 506 is situated, previously selected by teleconference display module 204 of cloud system 110. Device 504 displays Device 506 users 604, and allows Device A user 602 to see, hear, and communicate with Device 506 users 604. Although not illustrated in FIG. 6, Device 506 simultaneously displays on Device 506 LCD display 126 audiovisual information recorded by the camera and microphone of Device 504. Although a specific teleconference configuration is shown and described, embodiments contemplate outbound teleconference configurations displaying any configuration of visual and/or audio data, according to particular needs.

Continuing the example, at action 406, Device 504 monitors the in-room location and current perspective of Device 504 user 602. Perspective tracking module 308 of Device 504 uses the camera of Device 504 to record a 180-degree view of the room in which Device 504 is operating. Perspective tracking module 308 of Device 504 uses the room visual information to estimate the size of the room and the position and orientation of Device 504 in the room. Perspective tracking module 308 of Device 504 next identifies the face of Device 504 user 602. Perspective tracking module 308 compares the size of user 602 face with the estimated size of the room to estimate the distance from Device 504 to user 602. Perspective tracking module 308 of Device 504 also analyzes the off-center angle measured from the camera of Device 504 to user 602 face to estimate the location of user 602 in the room relative to Device 504. In this example, perspective tracking module 308 of Device 504 continuously records the in-room location and current perspective of Device 504 user 602 substantially in real time, and records the in-room location and current perspective of Device 504 user 602 in local perspective data 314 of teleconference device 120 memory 124. Similarly, Device 506 executes the actions described above to record and store the in-room location and current perspective of Device 506 users 604 substantially in real time.

Continuing the example, administration module 302 of Device 504 transmits local perspective data 314 of Device 504 user 602 to administration module 202 of cloud system 110. Administration module 202 stores local perspective data 314 of Device 504 user 602 in teleconference device perspective data 218 of cloud system 110 database 114. In this example, administration module 302 of Device 504 continuously transmits updated local perspective data 314 of Device 504 user 602 to cloud system 110 substantially in real time. Similarly, Device 506 executes the actions described above to continuously transmit updated local perspective data 314 of Device 506 users 604 substantially in real time.

Continuing the example, at action 408, perspective calculation module 206 of cloud system 110 selects different portions of Device 506 inbound audiovisual display stream 152 to comprise Device 504 outbound audiovisual display stream 152, depending on the current position of Device 504 user 602 with respect to Device 504. For example, and as illustrated in FIG. 7, by deviating from the initial narrowed, central field of view of the original 180-degree field of view of the room in which Device 506 is situated, and by panning to the left of the initial narrowed, central field of view as Device 504 user 602 moves to the right side of Device 504 (as interpreted from the perspective of user 602 facing Device 504), perspective calculation module 206 enables outbound audiovisual display stream 152 transmitted to Device 504 to approximate the perspective change that a window directly into Device 506 room would present to Device 504 user 602. Similarly, and as illustrated in FIG. 8, by panning to the right of the initial narrowed, central field of view as Device 504 user 602 moves to the left of Device 504 (as interpreted from the perspective of user 602 facing Device 504), perspective calculation module 206 again approximates the perspective change that a window directly into Device 506 room would present to Device 504 user 602.

Continuing the example, as the teleconference between Device 504 and Device 506 progresses, Device 504 user 602 moves from a straight-ahead viewing location with respect to Device 504 to the right of Device 504 (as interpreted from the perspective of user 602 facing Device 504). Perspective tracking module 308 of Device 504 records the change in the perspective of Device 504 user 602 in local perspective data 314 of Device 504. Administration module 302 of Device 504 transmits Device 504 local perspective data 314 to administration module 202 of cloud system 110. Administration module 202 stores Device 504 local perspective data 314 in teleconference device perspective data 218 of cloud system 110 database 114.

Continuing the example, perspective calculation module 206 of cloud system 110 administrator 112 accesses Device 504 local perspective data 314 stored in teleconference device perspective data 218. Perspective calculation module 206 determines that Device 504 user 602 has changed perspective with respect to Device 504. Perspective calculation module 206 transmits the information that Device 504 user 602 has changed perspective to teleconference display module 204. Teleconference display module 204 responds by accessing Device 506 inbound audiovisual display stream 152 stored in inbound audiovisual display stream data 214, and by selecting a leftward-looking portion of the original 180-degree view of the room in which Device 506 is situated, as compared to the narrowed, central field of view teleconference display module 204 had previously selected to comprise outbound audiovisual display stream 152. Teleconference display module 204 stores the leftward-looking portion of Device 506 inbound audiovisual display stream 152 as the updated Device 504 outbound audiovisual display stream 152 in outbound audiovisual display stream data 216. Administration module 202 of cloud system 110 transmits the updated Device 504 outbound audiovisual display stream 152 to administration module 302 of Device 504. Device 504 displays the updated Device 504 outbound audiovisual display stream 152 on Device 504 LCD display 126, as illustrated in FIG. 7.

FIG. 7 illustrates a second configuration of Device 504 participating in a teleconference with Device 506, according to an embodiment. Continuing the example, Device 504 displays on Device 504 LCD display 126 the audiovisual information contained in Device 504 outbound audiovisual display stream 152 that administration module 202 of cloud system 110 transmitted to Device 504. In this example, Device 504 displays on Device 504 LCD display 126 the narrowed, left-angled field of view portion of the original 180-degree view of the room in which Device 506 is situated, previously selected by teleconference display module 204 and perspective calculation module 206 of cloud system 110. Although not illustrated in FIG. 7, Device 506 simultaneously displays on Device 506 LCD display 126 audiovisual information recorded by the camera and microphone of Device 504. Although a specific teleconference configuration is shown and described, embodiments contemplate outbound teleconference configurations displaying any configuration of visual and/or audio data, according to particular needs.

Continuing the example, teleconference system 100 continually updates the outbound audiovisual display streams 152 in response to changes in the viewing perspectives of Device 504 user 602 and Device 605 users 604. For example, when Device 504 user 602 moves to the left side of Device 504 (as interpreted from the perspective of user 602 facing Device 504), teleconference system 100 performs actions 406 and 408 described above to update Device 504 outbound audiovisual display stream 152 as illustrated in FIG. 8.

FIG. 8 illustrates a third configuration of Device 504 participating in a teleconference with Device 506, according to an embodiment. Continuing the example, Device 504 displays on Device 504 LCD display 126 the audiovisual information contained in Device 504 outbound audiovisual display stream 152 that administration module 202 of cloud system 110 transmitted to Device 504. In this example, Device 504 displays on Device 504 LCD display 126 the narrowed, right-angled field of view portion of the original 180-degree view of the room in which Device 506 is situated, previously selected by teleconference display module 204 and perspective calculation module 206 of cloud system 110. Although not illustrated in FIG. 8, Device 506 simultaneously displays on Device 506 LCD display 126 audiovisual information recorded by the camera and microphone of Device 504. Although a specific teleconference configuration is shown and described, embodiments contemplate outbound teleconference configurations displaying any configuration of visual and/or audio data, according to particular needs. Concluding the example, teleconference system 100 terminates method 400 when Device 504 and Device 506 exit teleconference space 150.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
   two or more teleconference devices, each teleconference device operatively associated with at least one user and comprising an audiovisual recording device, the audiovisual recording device comprising a camera configured with at least a 180-degree field-of-view lens, and an audiovisual display device; and
   a computer coupled with a database and comprising a processor and memory, the computer configured to generate a teleconference space in which the two or more teleconference devices participate by:
   generating a teleconference space;
   transmitting requests to join the teleconference space to the two or more teleconference devices;
   storing in the computer memory identification data for each of the two or more teleconference devices;
   receiving inbound audiovisual display stream data from each teleconference device, said inbound audiovisual display stream data comprising audiovisual data recorded by the camera of the teleconference device audiovisual recording device;
   transmitting outbound audiovisual display stream data to one or more teleconference devices; and
   modulating the outbound audiovisual display stream data transmitted to the one or more teleconference devices in response to user perspective data, recorded by the camera of the audiovisual recording device, and transmitted to the computer by the one or more teleconference devices.

2. The system of claim 1, further comprising each teleconference device generating user perspective data by:
   locating the presence of at least one user with respect to the teleconference device; and
   continuously updating user perspective data as the user moves with respect to the teleconference device.

3. The system of claim 2, further comprising the computer modulating the outbound audiovisual display stream data transmitted to the one or more teleconference devices in response to user perspective data by:

selecting a portion of inbound audiovisual display stream data to comprise outbound audiovisual display stream data; and continuously updating the portion of inbound audiovisual display stream data selected to comprise outbound audiovisual display stream data in response to changes in at least one user perspective data as at least one user moves with respect to at least one teleconference device.

4. The system of claim 3, further comprising at least one teleconference device displaying the outbound audiovisual display stream data transmitted by the computer on the teleconference device audiovisual display device.

5. The system of claim 4, further comprising the computer generating and terminating separate teleconferences for separate groups of teleconference devices simultaneously.

6. The system of claim 1, wherein each teleconference device comprises a liquid crystal display with a pixel resolution of 3,840×2,160 pixels or greater and a diagonal size of 55 inches or greater in 16:9 proportion.

7. The system of claim 1, wherein each teleconference device audiovisual recording device further comprises a microphone.

8. A computer-implemented method, comprising:

generating, using a computer coupled with a database and comprising a processor and memory, a teleconference space in which two or more teleconference devices participate, wherein each teleconference device is operatively associated with at least one user and comprises an audiovisual recording device, the audiovisual recording device comprising a camera configured with at least a 180-degree field-of-view lens, and an audiovisual display device;

transmitting requests to join the teleconference space to the two or more teleconference devices;

storing in the computer memory identification data for each of the two or more teleconference devices;

receiving inbound audiovisual display stream data from each teleconference device, said inbound audiovisual display stream data comprising audiovisual data recorded by the camera of the teleconference device audiovisual recording device;

transmitting outbound audiovisual display stream data to one or more teleconference devices; and modulating the outbound audiovisual display stream data transmitted to the one or more teleconference devices in response to user perspective data, recorded by the camera of the audiovisual recording device, and transmitted to the computer by the one or more teleconference devices.

9. The computer-implemented method of claim 8, further comprising each teleconference device generating user perspective data by:

locating the presence of at least one user with respect to the teleconference device; and continuously updating user perspective data as the user moves with respect to the teleconference device.

10. The computer-implemented method of claim 9, further comprising modulating the outbound audiovisual display stream data transmitted to the one or more teleconference devices in response to user perspective data by:

selecting a portion of inbound audiovisual display stream data to comprise outbound audiovisual display stream data; and continuously updating the portion of inbound audiovisual display stream data selected to comprise outbound audiovisual display stream data in response to changes in at least one user perspective data as at least one user moves with respect to at least one teleconference device.

11. The computer-implemented method of claim 10, further comprising at least one teleconference device displaying the outbound audiovisual display stream data transmitted by the computer on the teleconference device audiovisual display device.

12. The computer-implemented method of claim 11, further comprising generating and terminating separate teleconferences for separate groups of teleconference devices simultaneously.

13. The computer-implemented method of claim 8, wherein each teleconference device comprises a liquid crystal display with a pixel resolution of 3,840×2,160 pixels or greater and a diagonal size of 55 inches or greater.

14. The computer-implemented method of claim 8, wherein each teleconference device audiovisual recording device further comprises a microphone.

15. A non-transitory computer-readable storage medium embodied with software, the software when executed configured to:

generate, using a computer coupled with a database and comprising a processor and memory, a teleconference space in which two or more teleconference devices participate, wherein each teleconference device is operatively associated with at least one user and comprises an audiovisual recording device, the audiovisual recording device comprising a camera configured with at least a 180-degree field-of-view lens, and an audiovisual display device;

transmit requests to join the teleconference space to the two or more teleconference devices;

store in the computer memory identification data for each of the two or more teleconference devices;

receive inbound audiovisual display stream data from each teleconference device, said inbound audiovisual display stream data comprising audiovisual data recorded by the camera of the teleconference device audiovisual recording device;

transmit outbound audiovisual display stream data to one or more teleconference devices; and modulate the outbound audiovisual display stream data transmitted to the one or more teleconference devices in response to user perspective data, recorded by the camera of the audiovisual recording device, and transmitted to the computer by the one or more teleconference devices.

16. The non-transitory computer-readable storage medium of claim 15, wherein the software when executed is further configured to generate user perspective data by:

locating the presence of at least one user with respect to at least one teleconference device; and continuously updating user perspective data as the user moves with respect to the teleconference device.

17. The non-transitory computer-readable storage medium of claim 16, wherein the software when executed is further configured to modulate the outbound audiovisual display stream data transmitted to the one or more teleconference devices in response to user perspective data by:

selecting a portion of inbound audiovisual display stream data to comprise outbound audiovisual display stream data; and continuously updating the portion of inbound audiovisual display stream data selected to comprise outbound audiovisual display stream data in response to changes in at least one user perspective data as at least one user moves with respect to at least one teleconference device.

18. The non-transitory computer-readable storage medium of claim 17, wherein the software when executed is further configured to display, on at least one teleconference device audiovisual display device, the outbound audiovisual display stream data transmitted to the teleconference device.

19. The non-transitory computer-readable storage medium of claim 18, wherein the software when executed is further configured to generate and terminate separate teleconferences for separate groups of teleconference devices simultaneously.

20. The non-transitory computer-readable storage medium of claim 15, wherein each teleconference device comprises a liquid crystal display with a pixel resolution of 3,840×2,160 pixels or greater and a diagonal size of 55 inches or greater.

* * * * *